United States Patent Office 2,899,469
Patented Aug. 11, 1959

2,899,469

HYDROPEROXIDES OF TERTIARY ALKYL CYCLOHEXENES

Jean P. Jones, Bartlesville, Okla., assignor to Phillips Petroleum Company, a corporation of Delaware No Drawing. Original application September 4, 1951, Serial No. 245,095, now Patent No. 2,708,664, dated May 17, 1955. Divided and this application October 19, 1953, Serial No. 387,046

10 Claims. (Cl. 260—610)

This application is a division of my copending application Serial No. 245,095, filed September 4, 1951, now U.S. Patent 2,708,664 issued May 17, 1955.

This invention relates to novel compositions of matter, their preparation and use. One aspect of this invention relates to the preparation of a novel $C_{14}$ hydrocarbon. Another aspect of this invention relates to novel $C_{14}$ hydroperoxides. A further aspect of this invention relates to the polymerization of monomeric materials containing a $CH_2=C<$ group.

In synthetic rubber research considerable study has been directed toward a bringing about of a more rapid copolymerization of butadiene and styrene. Many variations in recipes and procedures have been developed in order to obtain maximum rates of polymerization and polymeric materials having the desired characteristics. Recipes of the redox type, that is, formulations wherein both initiators and activators, oxidizing and reducing components are present, have been widely used. Initiators or oxidizing components frequently employed include materials of a peroxidic nature, and particularly compounds such as benzoyl peroxide and cumene hydroperoxide. Even though any peroxidic material might be expected to function in the capacity of an initiator in a redox emulsion polymerization system, this is not necessarily the case. In some instances little, if any, polymerization occurs while in other cases, with different peroxides, the reaction takes place at a satisfactory rate. Some peroxides may function fairly satisfactorily at higher temperatures but are of little value when it is desired to carry out polymerizations at low temperatures, say below the freezing point of water.

An object of this invention is to produce as a new compound a hydroperoxide which is particularly suitable in the polymerization of polymerizable organic compounds containing ethylenic unsaturation.

A further object of this invention is to produce a new hydrocarbon, which is valuable as an intermediate.

Further objects and advantages of this invention will become apparent to one skilled in the art from the accompanying disclosure and discussion.

I have discovered that it is possible to react 2,3-dimethylbutane with vinylcyclohexene under conditions which are the same as those used for reacting an isoparaffin with an olefin to produce an isoparaffin of higher molecular weight, e.g., the reaction of isobutane with a butene to produce isomeric octanes. By such conditions I refer to temperature, pressure, contact time, ratio of isoparaffin to olefin, catalysts, and manner of use of catalysts, all of which are now well known to the art. The product of this reaction comprises a hydrocarbon containing fourteen carbon atoms per molecule. The vinylcyclohexene employed will usually be produced by the dimerization of butadiene. Although various isomers probably exist, the product of liquid phase dimerization is generally composed largely of a single isomer.

I have also discovered that excellent conversion rates can be obtained in emulsion polymerization systems for producing polymers through the use of an initiator or catalyst composition comprising an oxidation product formed by oxidizing the $C_{14}$ hydrocarbon product resulting from such a reaction of 2,3-dimethylbutane with vinylcyclohexene. Not only are rapid polymerization rates obtained at low temperatures with these compositions, but with some recipes it is also possible to obtain advantageous results without having present in the polymerization system compounds of heavy metals, such as iron, except as such compounds may fortuitously be present in the polymerization. The rapid rates obtainable with the recipes of the present invention permit operation at low reaction temperatures, down to as low as −30° C. or −40° C. or lower.

The hydroperoxides which are one aspect of this invention, and which are used in the practice of other aspects of this invention, are prepared by the simple oxidation of products formed by the process which comprises reacting 2,3-dimethylbutane with vinylcyclohexene under isoparaffin alkylation conditions and in the presence of an isoparaffin-olefin alkylation catalyst. These oxidation products are believed to be novel and are considered part of my invention. By simple oxidation I means a reaction in which the final product is formed in one step, e.g., merely contacting the product with oxygen. In the preparation of these oxidation products the compounds to be oxidized are placed in a reactor, alone or in solution in an inert solvent such as benzene, normal decane, etc., and heated to the desired temperature. Although not absolutely necessary, I prefer to employ generally less than one percent of an oxidation initiator, such as another hydroperoxide or a salt thereof. One desirable initiator for use in this oxidation reaction is a mixture of potassium carbonate and diisopropylbenzene hydroperoxide. Air or free oxygen is introduced at a controlled rate throughout the reaction period, and the mixture is agitated during said reaction period, which is generally between one and ten hours. The oxidation temperature is preferably between 122 and 320° F., although in some instances it may be desirable to conduct the oxidation somewhat outside of this range. At the conclusion of the reaction the oxidized mixture can be employed in the polymerization reaction as such, that is, as a solution of the hydroperoxide composition in the resulting reaction mixture, or unreacted material and solvent can be first removed. The major active ingredient in such a composition is a monohydroperoxide or a mixture of monohydroperoxides.

While the present invention, in the main, is concerned with novel hydroperoxides for use in emulsion polymerization processes, I believe that the $C_{14}$ hydrocarbon, or hydrocarbons, from which the hydroperoxides are prepared are also novel compositions. These hydrocarbons are valuable intermediates and find utility in various arts, e.g., as starting materials in other synthesis reactions.

In the preparation of hydrocarbons of this invention the alkylation catalyst can be any that is effective for producing the alkylation of isoparaffins with olefins. Well known alkylation catalysts include halides of metals, phosphates of metals, inorganic acids, and clays, for example, aluminum chloride, the ferric halides, zinc chloride, zinc phosphate, an acid-treated magnesium-aluminum silicate clay, sulfuric acid, boron fluoride, boron trifluoride, complexes such as boron trifluoride etherate and boron trifluoride hydrate, hydrogen fluoride, phosphoric acid, mixed halides such as $AlCl_2F$ and $AlClF_2$, and/or mixtures of the above catalysts.

In the preparation of the hydrocarbons of this invention optimum reaction conditions employed will vary somewhat with the various catalysts used. However, these reaction conditions can be selected in accordance with knowledge available to the art. Substantially conventional alkylation conditions are normally used, such as, for example, a 2,3-dimethylbutane to vinylcyclohexene mol ratio in the range of approximately 1:1 to 20:1, a catalyst to hydrocarbon volume ratio of approximately 0.01:1 to 2:1, a temperature within the range of approximately 50° F. to 450° F., a contact time or residence time of the reaction mixture in the contactor from a few minutes, say five minutes or less, to several hours, usually less than eighteen, and a pressure adequate to maintain the reaction mixture in liquid phase. As indicated hereinbefore, the most desirable conditions employed within the range of conventional alkylation conditions will depend somewhat upon the particular catalyst used. When the alkylation catalyst employed is a hydrated boron trifluoride-hydrogen fluoride catalyst desirable alkylation conditions are a 2,3-dimethylbutane to vinylcyclohexene mol ratio of 15:1, a catalyst to hydrocarbon volume ratio of 0.09:1, a temperature of from 99° F. to 105° F., a residence time of 310 minutes, and atmospheric pressure.

The following examples are illustrative of methods which are suitable for preparing the compounds disclosed herein. It will be appreciated that the preparation of the catalyst and reacting ingredients, time of reaction, order of steps, and temperature may be varied, as will be evident to those skilled in the art.

EXAMPLE I

The reaction of 2,3-dimethylbutane (diisopropyl) and vinylcyclohexene was carried out in a reaction vessel, stirred with a propeller-type agitator. The feed line, thermocouple well, vent line, and agitator shaft all passed through a rubber stopper which sealed the flask. The catalyst used was prepared by saturating a 47 weight percent aqueous solution of hydrogen fluoride with boron fluoride. The catalyst and ⅛ of the n-heptane were placed in the reactor. The remaining n-heptane was blended with the 2,3-dimethylbutane and vinylcyclohexene. This feed passed through a rotameter to the catalyst mixture, to which it was added slowly, with agitation. The reaction was carried out at atmospheric pressure, and the temperature was maintained near 100° F. See Table Ia. After standing overnight in an ice bath, the catalyst phase was separated from the hydrocarbon phase. The latter was then washed twice with water and filtered. The unreacted 2,3-dimethylbutane and the n-heptane were removed from the reaction products by fractionation. Reflux ratios of 5:1 were used. The combined kettle bottoms from these two fractionations were further fractionated in a glass column packed with ⅛ inch protruded nickel packing. See Table Ib. Pressure ranged from 275 down to 5 mm. Hg, and a reflux ratio of 15:1 was used. Fractions from this distillation were subsequently combined and refractionated in a Hyper-Cal column using a reflux ratio of 100:1 at pressures ranging from 200 down to 3 mm. Hg. See Table II. The reaction appeared to proceed without difficulty, and the product was handled in the usual manner. The reaction conditions employed and the yields of crude fractions obtained in the first distillation were as follows:

Table Ia.—Reaction conditions

| | |
|---|---|
| Mol ratio diisopropyl to vinylcyclohexene | 15:1 |
| Volume n-Heptane per volume of total hydrocarbons charged | 0.5 |
| Catalyst, BF₃—HF—H₂O, volume percent | 9.1 |
| Temperature range, ° F. | 99–105 |
| Pressure | Atmos. |
| Reaction time, min. | 310 |

Table Ib.—Yields, grams/gram diolefin charged

Reaction product [1]:

| | |
|---|---|
| A Materials boiling below "Light Alkylate" (216–465° F.) | 0.20 |
| B "Light alkylate" (465–490° F.) | 0.20 |
| C Intermediate (490–580° F.) | 0.04 |
| D "Heavy alkylate" (580–586° F.) | 0.07 |
| E Bottoms (>586° F.) | 0.18 |
| Catalyst oils | 0.49 |

[1] Heptane and 2,3-dimethylbutane free.

The distillation fractions A, B, C, and D were then blended together and redistilled on the Hyper-Cal column. The products of this distillation were retained, and the properties of the fractions were found to be as follows:

Table II.—Properties of distilled reaction products

| Fraction | Atm. B. Pt., ° F. | Sp. Gr., 60/60 F. | Refractive Index, $n_D^{20}$ | Bromine Number [a] |
|---|---|---|---|---|
| I | 216–259 | | 1.4038 | 0.4 |
| II. Recovered "Diolefin" | 259–285 | 0.834 | 1.4484 | 0.4 |
| III. Intermediate | 285–465 | | 1.4638 | 22.0 |
| IV. "Light Alkylate" | 465–490 | 0.869 | 1.4708 | 4.6 |
| V. Intermediate | 490–580 | | 1.4840 | 12.0 |
| VI. "Heavy Alkylate" | 580–586 | 0.946 | 1.5022 | 5.0 |

[a] Grams of bromine per 100 grams of sample.

The material balance for the run, worked out on the basis of this distillation, is given in detail in Table III.

Table III.—Material balances on alkylation

REACTOR BALANCE

Charge: Weight in grams
| | |
|---|---|
| Diisopropyl | 4,867 |
| Vinylcyclohexene | 445 |
| n-Heptane | 6,388 |
| Catalyst | 2,742 |
| | 14,442 |

Recovery:
| | |
|---|---|
| Hydrocarbon phase | 11,452 |
| Catalyst phase [1] | 2,913 |
| | 14,365 |

Losses (assumed 32 gm. catalyst and 45 gm. hydrocarbon) 77 _____ (0.5%)

PRODUCT RECOVERY BALANCE

Washing:
| | |
|---|---|
| Hydrocarbon phase | 11,452 |
| Hydrocarbon phase recovered after filtering | 10,835 |
| Losses (charged to evaporation of light hydrocarbons) | 617(4.25%) |

FRACTIONATION

| | |
|---|---|
| Charge to stills | 10,835 |
| Recovered fractions | 10,689 |
| Losses | 146(1.35%) |

Fractions (losses prorated):
| | |
|---|---|
| Diisopropyl (includes 41 gm. loss) | 4,757 |
| n-Heptane (includes 98 gm. loss) | 5,775 |

Reaction products (includes 7 gm. column holdup loss):
| | |
|---|---|
| I. (216–259° F.) | 22 |
| II. (259–285° F.) recovered "diolefin" | 34 |
| III. (285–465° F.) | 24 |
| IV. (465–490° F.) Light "alkylate" | 91 |
| V. (490–580° F.) | 20 |
| VI. (580–586° F.) heavy "alkylate" | 32 |
| VII. Still bottoms | 80 |
| | 10,835 |

[1] Catalyst soluble oils—by difference—203 gms.

Consideration of the data, on the fractionation given in Tables II and III, indicates that essentially all the vinylcyclohexene was consumed. A fraction corresponding in boiling point to the diolefin (Fraction II, 259–285° F.) was recovered but, as indicated in Table II, it was found to be almost completely saturated. This "recovered 'diolefin'" fraction therefore was not considered as diolefin in calculating the yields. Considerably higher bromine numbers in the intermediate fractions on either side of this plateau, however, indicate some small quantities of unreacted vinylcyclohexene present.

The material which boiled from 465° F. to 490° F. comprises a $C_{14}$ hydrocarbon product resulting from a joining of one molecule of diisopropyl and one molecule of vinylcyclohexene. The material was practically water white. The very low bromine number of this product, 4.6, compared to the theoretical value of 82, indicated either that steric hindrance occurred, or that hydrogen exchange or a ring closure occurred. However, the refractive index is close to the expected value for a $C_8$-substituted cyclohexene, and too high for a substituted cyclohexane.

Oxidation of the sample of the light alkylate with hot concentrated nitric acid did not yield adipic acid, but only unidentified acidic products. Since adipic acid would be produced from a decalin derivative, the material is apparently not a decalin. It is also considered fairly certain that the reaction would occur on the alpha rather than the beta carbon atom of the vinyl side chain. This makes it difficult and unlikely for the ring to be closed to a decalin derivative. Dehydrogenation of the product over Pd-charcoal catalyst resulted in a small increase in refractive index, from $n_D^{20}$ 1.4708 to 1.4747. Infra-red examination of the product indicated that no ordinary olefinic unsaturation was present. One band, which has been observed as characteristic of cyclohexene rings, however, was present, but other correlations with cyclohexene were absent. No straight chains (—$CH_2$— groups) were present. I believe that the primary hydrocarbon reaction product is a highly branched octylcyclohexene, and most probably 4-(1,2,2,3-tetramethyl)-butylcyclohexene-1. However, 1,1,2,2-tetramethyldecahydronaphthalene may also be present. Each of these has the emprical formula $C_{14}H_{26}$. Regardless of any theory, the reaction product, i.e., the reaction mixture or the alkylate so prepared, is believed to be a novel composition and within the scope of my invention.

In preparing the novel hydroperoxides in accordance with this invention the reaction product, as such, can be oxidized and the resulting oxidation product will contain primarily a hydroperoxide. I prefer, however, to oxidize the fraction boiling within the range of from 465° F. to 490° F.

The following example illustrates one desired method of preparing the oxidized product.

EXAMPLE II

The oxidation of the product prepared according to Example I was carried out in a three-necked flask placed in a constant temperature bath and equipped with a stirrer. The oxidation was carried out with 53.3 grams of the so-called "light alkylate" (465° F. to 490° F.) fraction. Oxidation was brought about with air as the oxidant, at a temperature of 284° F., and at atmospheric pressure. A mixture of 0.2 gram of potassium carbonate and 0.2 gram of diisopropylbenzene hydroperoxide was used as an initiator. Oxidation was continued four hours and fifteen minutes. The 43.2 gm. of oxidate recovered was diluted with 128.3 gm. of heptane and washed at 9° F. with three 50 ml. portions of sulfuric acid (50 weight percent) followed by two 20 ml. portions of potassium carbonate solution (30 weight percent). The raffinate was dried over Drierite and then stripped of hydrocarbon at 194° F. and 3 mm. Hg pressure. The oxidation appeared to progress reasonably well. The maximum peroxide concentration, assuming the peroxide to be a $C_{14}$ hydroperoxide, calculated as 4.7 grams per 100 ml. of oxidation product was reached after four hours. The final concentration was 4.4 grams of hydroperoxide per 100 ml. of oxidation product, equivalent to 5.0 weight percent. The final product obtained after the washing treatment was 25 gms. Assuming the product to be a $C_{14}$ hydroperoxide, the final product contained 4.7 calculated weight percent. The majority of the weight loss sustained was due to handling.

As indicated heretofore, the hydroperoxide compositions of this invention give fast polymerizing rates when used to effect polymerization of organic compounds containing a $CH_2=C<$ group, either in homogeneous bulk polymerization or in emulsion polymerization. Also, in some cases the use of the hydroperoxides prepared in accordance with this invention results in a more uniform reaction rate over a given reaction period than do hydroperoxides heretofore used.

In one preferred modification, I use the hydroperoxides discussed herein as initiators or oxidants in polymerization recipes at low polymerization temperatures, i.e., from about 10° C., or just above the freezing point of water, to well below the freezing point of water, such as —40° C. or lower. The recipe will also include a reductant compound or activator. In some recipes this will be a single compound, or a mixture of homologous compounds, such as hydrazine, ethylenediamine, diethylenetriamine, aminoethylethanolamine, ethylenemethylethylenetriamine, tetraethylenepentamine, and the like. These compounds have the general formula

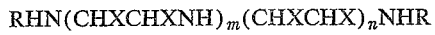
$$RHN(CHXCHXNH)_m(CHXCHX)_nNHR$$

where each R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, m is an integer between 0 and 8, inclusive, and n is an integer of the group consisting of 0 and 1 and is 1 when m is greater than 0. Each of the foregoing radicals (other than hydrogen) can be completely hydrocarbon in character, and can be of mixed character when containing six or more carbon atoms, such as alkylcycloalkyl, aralkyl, alkaryl groups, and the like, and can also have non-hydrocarbon substituents, some of which will have the effect of making them more water-soluble and less oil- (hydrocarbon) soluble; particularly useful non-hydrocarbon substituents include oxygen in the form of hydroxy and ether compounds, sulfur in similar compounds (i.e., mercapto compounds and thioethers) and halogen compounds. In such recipes, such a polyamino compound appears to act as a reductant, and no other activating ingredients, such as compounds of polyvalent-multivalent metals, or reducing ingredients, such as a reducing sugar, need be present in order to obtain satisfactory and rapid polymerization of the monomeric material, even at subfreezing temperatures. The amount of polyamino compound used to obtain optimum results also is dependent upon other ingredients in the recipe. Preferred results are usually obtained with between 0.02 to 5 parts by weight, per 100 parts of monomeric material, of the polyamino compound. In other recipes a composition is used which comprises one compound which is an oxidation catalyst, or activator, and another different compound which is a reductant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. The multivalent metal ion of the oxidation catalyst can easily and readily pass from a low valence state to a higher valence state, and vice versa. Sometimes this compound, when present in its lower valence state, can function in the dual role of reductant and oxidation catalyst. One commonly used oxidation catalyst is an iron pyrophosphate, and is separately made up in aqueous solution from a ferrous salt, such as ferrous sulfate, and a pyrophosphate of an alkali metal, such as sodium or potassium.

When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate. When preparing the activator the mixture is generally heated above 50° C., for variable periods, depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 60° C. for a period of heating ranging from 10 to 30 minutes. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use it is generally employed in the form of an aqueous dispersion, as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere, such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex, whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

The amounts of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3.5, with a preferred ratio between 1:0.35 and 1:2.8.

In effecting emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

As previously stated, it is usually desirable that the multivalent metal be present in its lower valence state. With some recipes it is unnecessary to include an organic reducing agent either in the activator solution or in the polymerization mixture. However, particularly at temperatures above 0° C., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state it is usually necessary to include in the activator solution an organic reducing agent. As a result, the multivalent ion will be partially reduced and a substantial amount of the multivalent ion will be present in its lower valence state when the activator solution is ready for addition to the polymerization mixture.

The monomeric material polymerized to produce polymers by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, nitrile, carboxy, or the like. Included in this class of monomers are the conjugated butadienes. I prefer conjugated diolefins having from four to six carbon atoms, for example, 1,3-butadienes such as butadiene (1,3-butadiene), 2,3-dimethyl-1,3-butadiene, isoprene, piperylene, 3-furyl-1,3-butadiene, 3-methoxy-1,3-butadiene, and the like. Other olefins are haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chloro styrene, p-methoxy-styrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers. In addition, high molecular weight polymers can be formed by the practice of this invention.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case, the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will therefore be more particularly discussed and exemplified with reference to these typical reactants. With those specific monomers it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. The aqueous medium to monomeric material can, however, be as low as 0.15:1. It is frequently desirable to include water-soluble components in the aqueous phase, particularly when the polymerization temperatures are below freezing. Inorganic salts and alcohols can be so used. Alcohols which arm applicable, when operating at low temperatures, comprise water-soluble compounds of both the monohydric and polyhydric types, and include methyl alcohol, ethylene glycol, glycerine, crythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 percent or more of the alcohol present be in the aqueous phase. A high-boiling alcohol such as glycerine is difficult to recover from the resulting serum; a low-boiling alcohol such as methanol is easily removed and frequently preferred. If the resulting latex tends to gel at low reaction temperatures, a larger proportion of the aqueous phase should be used. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 98 percent of the monomeric material is polymerized.

One of the advantages of the use of the hydroperoxides, as disclosed herein, is that it is feasible to produce "high solids" latices, i.e., latices resulting from the use of an amount of aqueous medium in the lower part of the range disclosed, i.e., a ratio of aqueous phase to monomeric material between 0.5:1 to 1:1 and an extent of conversion in the higher part of the range disclosed, i.e., from 70 percent conversion to complete conversion.

Emulsifying agents which are applicable in these low temperature polymerizations are materials such as potassium laurate, potassium oleate, and the like, and salts of rosin acids. Particularly useful are the specific mixtures of salts of fatty acids and of rosin acids, which seem to have a synergistic action when used with some of these same hydroperoxides, as more fully disclosed and claimed by Charles F. Fryling and Archie E. Follett in their abandoned application Serial No. 72,534, filed January 24, 1949. However, other emulsifying agents such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase can be varied over a rather wide range without producing deleterious effects on the conversion rate or the properties of the polymer. In general the pH may be within the range of 9.0 to 12, with the narrower range of 9.5 to 10.5 being most generally preferred.

The mercaptans applicable in this invention are usually alkyl mercaptans. These may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general the greater modification is obtained when operating at low temperatures and therefore a smaller amount of mercaptan is added to yield a product of a given Mooney value than is used at higher temperatures. In the case of tertiary mercaptans, such as tertiary $C_{12}$ mercaptans, blends of tertiary $C_{12}$, $C_{14}$, and $C_{16}$ mercaptans and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus, the amount of mercaptan is adjusted to suit the case at hand.

The amount of the hydroperoxide prepared according to this invention, which can be used to obtain an optimum reaction rate, will depend upon the other reaction conditions, and particularly upon the type of polymerization recipe used. The amount is generally expressed in millimols per 100 parts of monomeric material, using in each instance the same units of weight throughout, i.e., when the monomeric material is measured in pounds, the hydroperoxide is measured in millipound mols. The same is true for other ingredients of the polymerization recipe. An optimum rate of polymerization is usually obtained with the amount of hydroperoxide between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide, since it is promptly converted to the hydroperoxide by hydrolysis when the salt is admixed with the aqueous medium of the polymerization reaction mixture.

In order to illustrate the advantages of this invention the hydroperoxide prepared in accordance with Examples I and II, disclosed hereinbefore, was compared with cumene hydroperoxide in the recipe which follows. The reactants, their proportions, and other specific ingredients of the recipe are presented as being typical and should not be construed to limit the invention unduly. The hypodermic syringe technique was used to withdraw samples periodically for determination of conversion. The temperature of all polymerization tests was 41° F. The alkylate hydroperoxide prepared in accordance with Examples I and II will be referred to as "hydroperoxide a." Copolymerization of butadiene and styrene was carried out at 41° F. using the following recipe. Polymerization was carried out according to conventional procedure.

EXAMPLE III

| Component: | Parts |
|---|---|
| Butadiene | 72 |
| Styrene | 28 |
| Water | 180 |
| Dresinate 214 (a) | 4.7 |
| Potassium chloride | 0.5 |
| Hydroperoxide | variable |
| Potassium pyrophosphate | 0.165 |
| Ferrous sulfate heptahydrate | 0.14 |
| Potassium hydroxide | 0.037 |
| Dextrose | 1.0 |
| MTM (b) | 0.25 |

(a) Potassium salt of disproportionated rosin acid.
(b) Blend of 60 percent tertiary $C_{12}$ mercaptan, 20 percent tertiary $C_{14}$ mercaptan and 20 percent tertiary $C_{16}$ mercaptan.

The results of the tests with the recipe of Example III are assembled in Table IV. Cumene hydroperoxide was used in the control experiments. Quantities of hydroperoxide taken were designed to yield equivalent amounts of active oxygen.

Table IV

| Hydroperoxide | | Conversion, Percent at— | | | |
|---|---|---|---|---|---|
| From— | Parts | 2 Hr. | 4.5 Hr. | 7 Hr. | 24 Hr. |
| Hydroperoxide a | 0.160 | 26.5 | 54.5 | 76.7 | 98.5 |
|  | 0.160 | 28.9 | 56.7 | 77.5 | 98.5 |
|  | 0.160 | 25.8 | 55.5 | 75.5 | 97.0 |
|  | 0.160 | 27.9 | 54.4 | 77.5 | 99.0 |
| Cumene hydroperoxide | 0.10 | 13.9 | 27.6 | 37.2 | 93.0 |
|  | 0.10 | 17.0 | 31.1 | 43.0 | 94.0 |
|  | 0.10 | 15.4 | 26.4 | 38.2 | 95.5 |

EXAMPLE IV

The copolymerization of butadiene and styrene was carried out at 41° F. using the following peroxamine recipe and conventional procedure:

| Component: | Parts by weight |
|---|---|
| Butadiene | 72 |
| Styrene | 28 |
| Water | 180 |
| Dresinate 214 | 4.5 |
| MTM (a) | 0.26 |
| Hydroperoxide | variable |
| Triethylenetetramine | 0.11 |
| Complexing agent (b) | 0.025 |
| Sodium bisulfite | 0.10 |
| Potassium hydroxide | 0.049 |
| Trisodium phosphate dodecahydrate | 0.50 |
| Daxad 11 (c) | 0.10 |

(a) As in Example III.
(b) Sodium salt of ethylene diamine tetra acetic acid.
(c) Polymerized sodium salts of alkyl naphthalene sulfonic acids.

In all tests, 30 grams of the combined monomers were used. In this example results obtained by hydroperoxide $a$ of this invention, cumene hydroperoxide and t-butyl-isopropylbenzene hydroperoxide, to be called hydroperoxide $b$, will be compared.

The results of the test with the recipe of Example IV are assembled in Table V. Both cumene hydroperoxide and t-butyl-isopropylbenzene hydroperoxide (hydroperoxide $b$) were used as controls with the quantities of each adjusted to yield equivalent amounts of active oxygen.

Table V

| Hydroperoxide | | Conversion, Percent at— | | | |
|---|---|---|---|---|---|
| From— | Parts | 2 Hr. | 4.5 Hr. | 10 Hr. | 24 Hr. |
| Hydroperoxide a | 0.256 | 14.0 | 29.4 | 62.0 | 87.8 |
|  | 0.256 | 14.0 | 31.0 | 62.3 | 86.6 |
| Cumene hydroperoxide | 0.160 | 13.8 | 24.6 | 39.0 | 54.0 |
|  | 0.160 | 14.7 | 22.2 | 41.5 | 62.4 |
| Hydroperoxide b | 0.219 | 21.4 | 35.4 | 59.7 | 79.5 |
|  | 0.219 | 19.4 | 35.6 | 64.0 | 82.5 |

From Tables IV and V can be seen the markedly superior results obtained by employing emulsion polymerization recipes in which the hydroperoxide of this invention is employed. As can be seen from Table IV, the initiator of the instant invention was about twice as active as cumene hydroperoxide, and the conversion rate was well sustained. Table V also shows the superior results obtained by operating according to the present invention. When my hydroperoxide initiator was used in the recipe of Example IV the rate was better sustained and a considerably higher conversion was realized at twenty-four hours than was obtainable with cumene hydroperoxide and hydroperoxide $b$. The hydroperoxide of this invention also shows a more uniform rate of polymerization than hydroperoxide $b$ (t-butyl-isopropylbenzene hydroperoxide). As has been seen, this invention provides not only a novel hydroperoxide for use in emulsion polymerization recipes, but also a valuable novel intermediate produced during the preparation of the hydroperoxide. Obviously, variations will occur to those skilled in the art. Modifications can be made without departing from the spirit and scope of this invention.

I claim:

1. A process for the preparation of a novel $C_{14}$ hydrocarbon which comprises reacting in a hydrocarbon mixture 2,3-dimethylbutane and vinylcyclohexene in a molar ratio of about 1 to 20 parts of 2,3-dimethylbutane to 1 part of vinylcyclohexene under alkylation conditions and in the presence of an alkylation catalyst, said alkylation conditions including a temperature in the range of about 50 to 450° F., a residence time of from 5 to 1,080 minutes, and a pressure sufficient to maintain the reactants in a liquid phase, the ratio of said catalyst to said hydrocarbon mixture being in the range of about 0.01 to 2 parts by volume of catalyst to 1 part by volume of hydrocarbon mixture, thereby forming an alkylation reaction product, and recovering as a product of the process that fraction of said alkylation reaction product boiling in the range of 465 to 490° F.

2. A process according to claim 1 wherein said fraction has a refractive index of about $n_D^{20}$ 1.4708, a specific gravity at 60° F. of about 0.869 and a bromine number of about 4.6.

3. A novel composition of matter prepared by the process of claim 1.

4. A hydroperoxide of said novel $C_{14}$ hydrocarbon prepared by the process of claim 1.

5. A process for the preparation of a novel $C_{14}$ hydrocarbon which comprises reacting in a hydrocarbon mixture 2,3-dimethylbutane and vinylcyclohexene in a molar ratio of about 15 parts of 2,3-dimethylbutane to 1 part of vinylcyclohexene under alkylation conditions and in the presence of a hydrated boron trifluoride-hydrogen fluoride alkylation catalyst, said alkylation conditions including a temperature in the range of about 99 to 105° F., a residence time of about 310 minutes, and a pressure of about 1 atmosphere, the ratio of said catalyst to said hydrocarbon mixture being about 0.09 part by volume of catalyst to 1 part by volume of hydrocarbon mixture, thereby forming an alkylation reaction product and recovering as a product of the process that fraction of said alkylation reaction product boiling in the range of about 465 to 490° F.

6. A novel composition of matter prepared by the process of claim 5.

7. A process for the preparation of a novel $C_{14}$ hydroperoxide which comprises reacting in a hydrocarbon mixture 2,3-dimethylbutane and vinylcyclohexene in a molar ratio of about 1 to 20 parts of 2,3-dimethylbutane to 1 part of vinylcyclohexene under alkylation conditions and in the presence of an alkylation catalyst, said alkylation conditions including a temperature in the range of about 50 to 450° F., a residence time of from 5 to 1,080 minutes, and a pressure sufficient to maintain the reactants in a liquid phase, the ratio of said catalyst to said hydrocarbon mixture being in the range of about 0.01 to 2 parts by volume of catalyst to 1 part by volume of hydrocarbon mixture, thereby forming an alkylation reaction product, recovering a fraction of said alkylation reaction product boiling in the range of 465 to 490° F., oxidizing said fraction with an oxidizing gas at a temperature in the range of 122 to 320° F., for a time of from 1 to 10 hours, and in the presence of an oxidation catalyst, and recovering said hydroperoxide.

8. A novel composition of matter prepared by the process of claim 7.

9. A process for the preparation of a novel $C_{14}$ hydroperoxide which comprises reacting in a hydrocarbon mixture 2,3-dimethylbutane and vinylcyclohexene in a molar ratio of about 15 parts of 2,3-dimethylbutane to 1 part of vinylcyclohexene under alkylation conditions in the presence of a hydrated boron trifluoride-hydrogen fluoride alkylation catalyst, said alkylation conditions including a temperature in the range of about 99 to 105° F., a residence time of about 310 minutes, and a pressure of about 1 atmosphere, the ratio of said catalyst to said hydrocarbon mixture being about 0.09 part by volume of catalyst to 1 part by volume of hydrocarbon mixture, thereby forming an alkylation reaction product, recovering that fraction of said alkylation reaction product boiling in the range of 465 to 490° F., oxidizing said fraction with an oxidizing gas selected from the group consisting of air and free oxygen at a temperature of about 284° F., a pressure of about 1 atmosphere for a time of about 255 minutes and in the presence of an oxidation catalyst, thereby producing an oxidation product containing said novel $C_{14}$ hydroperoxide, and recovering said hydroperoxide.

10. A novel composition of matter prepared by the process of claim 9.

References Cited in the file of this patent

UNITED STATES PATENTS

| 2,121,472 | Niederl et al. | June 21, 1938 |
| 2,535,345 | Bishop et al. | Dec. 26, 1950 |
| 2,603,629 | Bloch | July 15, 1952 |
| 2,665,269 | Reynolds et al. | Jan. 5, 1954 |

OTHER REFERENCES

Niederl et al.: Jour. Amer. Chem. Soc., vol. 59 (1937), p. 716.

Slobodin et al.: Chem. Abstracts, vol. 43 (1949), Cols. 1017–18 (2 pages).

Frank: Chem. Reviews, vol. 46 (1950), p. 151.

Fisher et al.: Industrial & Eng. Chem., vol. 43 (March 1951), pp. 671–674.